United States Patent [19]

Frisch

[11] 4,071,592

[45] Jan. 31, 1978

[54] METHODS OF SALVAGING IMPROPERLY PROCESSED RESINOUS

[75] Inventor: Rudolf Frisch, Yardley, Pa.

[73] Assignee: Congoleum Corporation, Kearny, N.J.

[21] Appl. No.: 635,197

[22] Filed: Nov. 25, 1975

[51] Int. Cl.² .................... B29D 7/20; B29D 27/02
[52] U.S. Cl. .................................. 264/54; 264/45.6; 264/132
[58] Field of Search .............. 264/46.3, 45.3, 54, 264/DIG. 82, 132, 129, 45.6, 40.1, 40.2, 45.1, 45.5; 156/78, 79; 428/71; 427/140, 144

[56] References Cited

U.S. PATENT DOCUMENTS

| | | | |
|---|---|---|---|
| 3,293,094 | 12/1966 | Nairn et al. | 264/46.3 |
| 3,293,103 | 12/1966 | Nairn et al. | 264/45.3 |
| 3,365,353 | 1/1968 | Witman | 264/54 |
| 3,373,072 | 3/1968 | Jones | 264/54 |
| 3,772,138 | 11/1973 | Witman | 264/54 |
| 3,914,485 | 10/1975 | Curtis | 264/54 |

*Primary Examiner*—Donald J. Arnold
*Attorney, Agent, or Firm*—Richard T. Laughlin

[57] ABSTRACT

In the art of making chemically embossed sheets of resinous material for use as floor, wall, desk and table coverings, a method of salvaging and recovering a backing sheet material and a potentially foamable, gelled plastisol composition on which has been improperly or inaccurately applied a printing ink composition containing an anhydride having blow-modifying properties which comprises: (1) treating the printing ink composition and the potentially foamable, gelled plastisol composition with a neutralizing, inhibiting or negating composition capable of destroying or rendering substantially ineffectual the blow-modifying properties of the anhdride without destroying or rendering ineffectual the blowing and foaming properties of the potentially foamable, gelled plastisol composition; (2) reprinting the potentially foamable, gelled plastisol composition with another printing ink composition containing a blow-modifier; and (3) blowing or foaming the potentially foamable, gelled plastisol composition, whereby chemically embossed effects are obtained as a result of the blow-modifying properties of the blow-modifier used in the reprinting process, rather than the blow-modifier used in the initial printing process.

10 Claims, 3 Drawing Figures

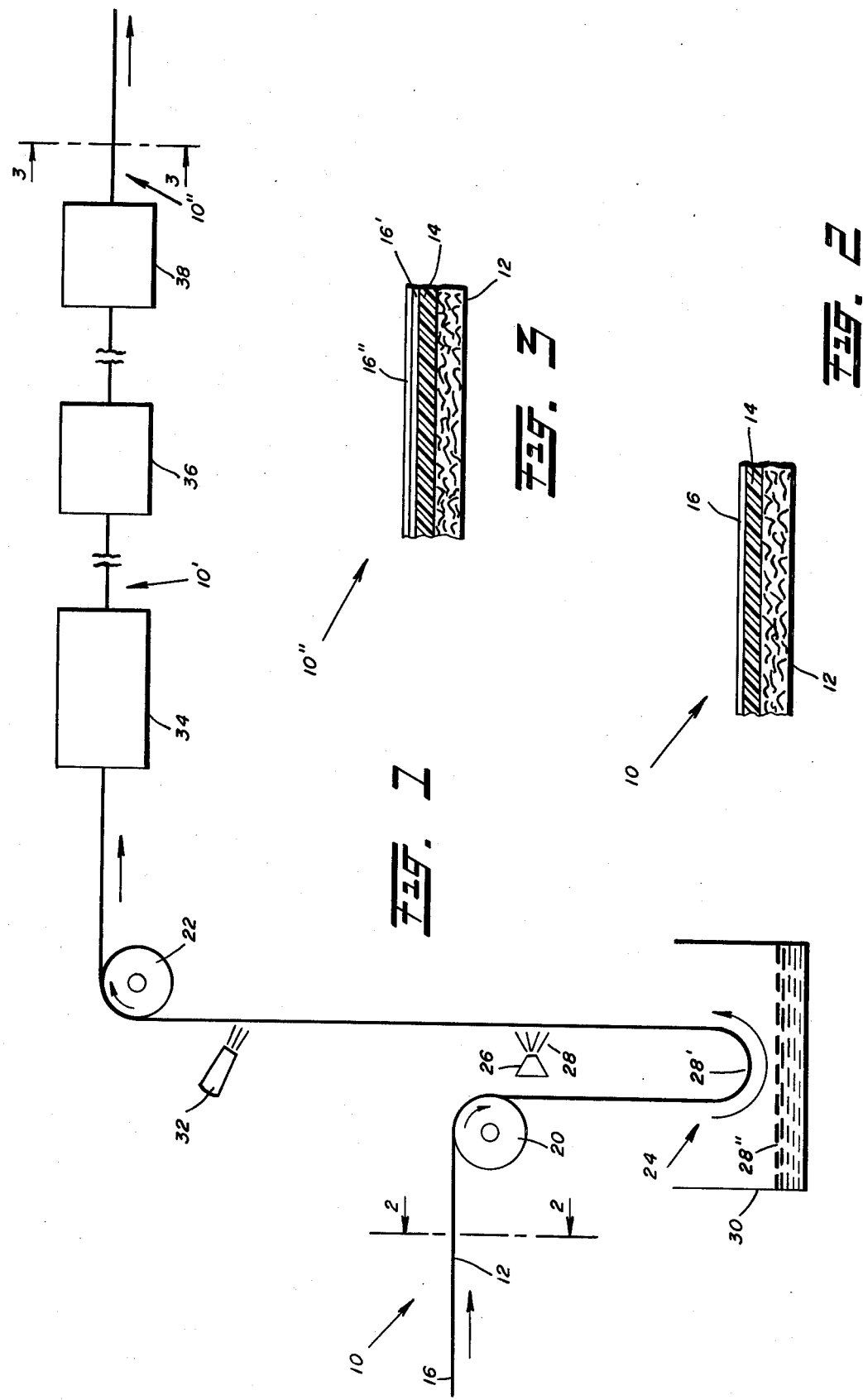

METHODS OF SALVAGING IMPROPERLY PROCESSED RESINOUS

GENERAL BACKGROUND

In commercial processes generally used for making chemically embossed sheets of resinous materials to be used, for example, as floor, wall, desk or table coverings, a liquid or semi-liquid, potentially foamable plastisol composition containing a blowing or foaming agent is applied substantially uniformly as a relatively thin uniform coating to the surface of a backing sheet material. The potentially foamable plastisol composition is then gelled to a relatively firm state by being heated at a controlled elevated temperature for a required period of time. The elevated temperature is controlled and is kept sufficiently low that gelling of the potentially foamable plastisol composition takes place without activating or decomposing the blowing or foaming agent and without creating any blowing or foaming of the potentially foamable plastisol composition.

Printing ink compositions, some of which contain blow-modifiers, which term includes blow-inhibitors, suppressants, accelerators, retarders, promoters, etc., are then applied to the surface of the gelled, potentially foamable plastisol composition in desired patterns and designs and the printed potentially foamable plastisol composition is then dried, again without creating any blowing or foaming. As used herein, the term "blow-modifier" is used to comprise any material included in a printing ink or other composition which is intended to alter the temperature at which blowing or foaming takes place, or the extent to which such blowing or foaming occurs.

Subsequently, when the gelled, potentially foamable plastisol composition with the printing ink compositions applied thereto in the desired designs or patterns is heated to a controlled, sufficiently higher temperature as to bring about blowing or foaming, those patterned areas printed with a blow-modifier printing ink composition are affected and their blowing and foaming modified accordingly, whereas those patterned areas not printed with any blow-modifying printing ink compositions blow or foam normally, whereby the differential blowing or foaming effect and the chemically embossed effects are created.

More specific details and the use of printing ink compositions containing blow-modifiers are to be found in U.S. Pat. Nos. 3,293,094 and 3,293,108 which issued on Dec. 20, 1966 to R. F. Nairn et al.

SPECIFIC BACKGROUND OF THE PRESENT INVENTIVE CONCEPT

It has occasionally been found that the printing of the gelled, potentially foamable plastisol composition with the printing ink composition containing the blow-modifier is not always sufficiently precise or perfect and the desired pattern is occasionally out-of-registry or alignment, or is blurred, or otherwise unsatisfactory. As a result, the product is unacceptable commercially for non-registry or non-alignment, or blurring, or other reasons. Unfortunately, however, the improperly or inaccurately applied printing ink composition is well adhered to the surface of the gelled, potentially foamable plastisol composition and its blow-modifying effects will be obtained, even though the gelled, potentially foamable plastisol composition is reprinted or overprinted precisely and perfectly with the desired pattern or design. In other words, the embossing effects of the blow-modifiers in both patterns, that is, the faulty pattern and the perfect pattern will be visible in the final blown and foamed product. This, of course, renders the final product unacceptable, commercially.

Efforts to remove the improperly or inaccurately applied printing ink composition so that the gelled, potentially foamable plastisol composition can be salvaged and reused have not been successful. It has therefore been previously necessary to scrap and discard as useless the gelled, potentially foamable plastisol compositions which have not been properly or accurately printed with the blow-modifier containing printing ink compositions. This, of course, is very uneconomical and is highly undesirable. It is all the more uneconomical and undesirable when it is realized that the backing sheet material to which the gelled, potentially foamable plastisol composition is adhered also must be scrapped and discarded.

PURPOSES AND OBJECTS OF THE PRESENT INVENTIVE CONCEPT

It is therefore a principal purpose and object of the present inventive concept to provide methods for neutralizing, inhibiting, or negating the effects of a blow-modifier included in a printing ink composition, if it is determined that that particular printing ink composition was not applied to the gelled, potentially foamable plastisol composition in a satisfactory fashion, or is out-of-register, or not in alignment, or is blurred, or is not acceptable for any reason. In this way, the effects of the blow-modifier in the improperly or inaccurately applied printing ink composition may be neutralized, inhibited, or negated and the gelled, potentially foamable plastisol composition may be reprinted or overprinted with another printing ink composition, also containing a blow-modifier, and then blown or foamed to yield a satisfactorily embossed final product in which only the effects of the blow-modifier in the satisfactorily applied printing ink composition will be visible. As a result, the improperly or inaccurately printed potentially foamable, gelled plastisol composition (and the backing sheet material upon it is adhered) can be salvaged, recovered, and then reprinted and blown to yield a commercially acceptable product. Other purposes and other objects of the present inventive concept will become apparent from a further reading of this specification.

BASIC SUMMARY OF THE PRESENT INVENTIVE CONCEPT

It has been found that such principal purpose and object, as well as other purposes and objects of the present inventive concept, may be accomplished by treating the improperly or inaccurately applied printing ink composition and the gelled, potentially foamable plastisol composition with a neutralizing or negating composition which will substantially destroy the capability and the efficacy of the blow-modifier therein, without destroying the capability or the efficacy of the blowing agent in the gelled, potentially foamable, plastisol composition. In this way, the gelled, potentially foamable, plastisol composition may be reprinted or overprinted in a pattern or design with another printing ink composition containing blow-modifying characteristics, and then blown or foamed with only the embossed pattern or design of the second applied printing ink composition showing in the final blown and foamed product.

More specifically, it has been found that, if a neutralizing, inhibiting or negating composition comprising: (1) a water soluble chemical having a solvent, swelling, or softening action on the printing ink composition and also on the potentially foamable plastisol composition; and (2) water or other reactive chemical compound is applied to the improperly applied printing ink composition on the surface of a potentially foamable plastisol composition, the blow-modifier will be neutralized, inhibited or negated, when it is capable of reacting with the water or other reactive chemical compound to be converted to a different chemical compound having little or no effectual blow-modifying properties.

The present inventive concept will be specifically described and illustrated with respect to various organic anhydrides as the blow-modifying agents and with respect to water in its various liquid and gaseous forms and/or ammonium hydroxide, amines, and alcohols as the reacting chemicals which will convert the particular anhydride to the corresponding acid and/or amide form and/or ester, or other form wherein it possesses considerably lesser or no blow-modifier properties. Such reactions are generally classified as hydrolysis, ammonolysis, and/or alcoholysis of the anhydride.

It is to be appreciated that, in some particular instances, the acid, ester and/or amide form which results may still possess some blow-modifying properties to a limited extent and that, in such particular instances, it is possible that, unless the reacting conditions are carefully adjusted and controlled, the blow-modifier in the original, improperly or inaccurately applied printing ink composition may still interfere with the embossing effect achieved by the blow-modifier in the subsequently applied reprinting or overprinting procedure. The present inventive concept must therefore be limited to those organic anhydrides which can more easily be converted to acids, esters, and/or amides which do not retain sufficient blow-modifying properties as to interfere with any printing ink compositions which are subsequently applied as a reprinting or overprinting on top of the originally improperly or inaccurately applied printing ink composition. Thus, under the specific conditions used in the application of the present inventive concept, the anhydride blow-modifiers are converted to other chemical forms wherein their blow-modifying properties are substantially ineffectual.

BRIEF DESCRIPTION OF THE DRAWINGS

The invention will be more fully and clearly understood from the description which follows, taken in conjunction with the accompanying self-explanatory drawings in which there is illustrated a preferred design of apparatus, mode of operation, and product embodying the invention. It is to be understood, however, that the invention is not to be considered as limited to the constructions disclosed except as determined by the scope of the appended claims. In the drawings:

FIG. 1 is a schematic, diagrammatic showing of a preferred apparatus and method for carrying out the principles of the present inventive concept;

FIG. 2 is a cross-sectional view, fragmentary, schematic, and diagrammatic, of a sheet of resinous material at one early stage of the method, taken on the line 2—2 of FIG. 1, in the direction indicated by the arrows; and FIG. 3 is a cross-sectional view, fragmentary, schematic, and diagrammatic, of a sheet of resinous material at another later stage of the method, taken on the line 3—3 of FIG. 1, in the direction indicated by the arrows.

DESCRIPTION OF THE PREFERRED EMBODIMENT

In FIGS. 1 - 3, there is shown a continuous sheet of resinous material 10, the lower side of which comprises a backing sheet material 12 and the upper side of which comprises a potentially foamable, gelled plastisol composition 14 (see FIGS. 2 and 3), upon which has been applied a printing ink composition 16 in a desired pattern or design. The preparation of such a continuous sheet of resinous material 10 is described in great particularity in the U.S. Pat. Nos. 3,292,094 and 3,293,108, previously referred to hereinbefore. Such preparation should need no further discussion except for the following description.

THE BACKING SHEET MATERIAL

The specific type of backing sheet material 12 which is used does not relate to the essence of the present inventive concept and may be a matted or felted fibrous sheet, a woven fabric, a nonwoven fabric, a knitted fabric, or substantially any type of sheet material. It may be formed of mineral fibers, natural fibers of wool, silk, or cellulosic origin, synthetic or man-made fibers or filaments, monofilamentary, multifilamentary, or staple, such as rayon, nylon, polyesters, polyolefins, etc., asbestos, glass wool, mineral or slag wool, metallic threads, etc. Such a backing sheet material 12 may have been previously impregnated or saturated with a water-resistant or strengthening material, such as a vinyl resin, a butadiene-styrene resin, or other thermoplastic, cross-linking or thermosetting resins, if so desired or required. A smoothing or sealing coat may be applied to the upper side thereof, principally to minimize felt or fiber irregularities.

The thickness of the backing sheet material 12 varies within a relatively wide range, primarily depending upon the future use to which the product will be directed, and normally is the range of from about 0.015 inch to 0.150 inch, or even greater, if required or desired.

Additional information and specific examples of other backing sheet materials may be found in the previously mentioned U.S. Pat. Nos. 3,293,094 and 3,293,108.

THE POTENTIALLY FOAMABLE GELLED PLASTISOL COMPOSITION

The specific nature of the potentially foamable plastisol composition 14 which is applied to the surface of the backing sheet material 12 does not relate to the essence of the invention but is preferably a dispersion or a suspension of a resin in a liquid or a semi-liquid medium. The dispersing or suspending medium may be water in the case of an aqueous latex, or it may be an organic solvent in the case of an organosol, or it may be a plasticizer in the case of a plastisol.

Plastisols are preferred because of their ease of handling and processing and the fact that their use does not require the subsequent removal of large volumes of water, such as in the case of an aqueous latex, or the subsequent removal and possible necessary recovery of large amounts of organic solvents, such as in the case of an organosol.

The preferred and most widely used resin presently employed in such a plastisol is polyvinyl chloride, either as a homopolymer, copolymer, terpolymer, block polymer, etc. However, many other resins are of use, such as polyolefins as polyethylene and polypropylene, the acrylates and methacrylates, polyamides, polystyrenes, phenolics, ureas, neoprene, ureaformaldehyde, synthetic rubber, etc.

Various plasticizers such as dibutyl sebacate, butyl benzyl phthalate, di(2-ethylhexyl) phthalate, dioctyl phthalate, etc., are also included in the potentially foamable plastisol composition, as well as various stabilizers, such as phenyl phthalate, dibasic lead phosphite, etc., to reduce the harmful effects of degradation due to light and heat. Pigments and dyes such as titanium dioxide, as well as blowing and foaming agents, such as azodicarbonamide, azobisisobutyronitrile, diazoaminobenzene, etc., are also included. Accelerators, inhibitors, catalysts, anti-oxidants, viscosity-changing agents, etc., are also included, if required. Typical formulations and compositions of potentially foamable, gelled plastisol compositions are to be found in the previously mentioned U.S. Pat. Nos. 3,293,094 and 3,293,108.

After the potentially foamable plastisol composition has been applied to the backing sheet material 12 by standard and conventional procedures well known in the art, it is then heated in an oven or other suitable heating means maintained at an elevated temperature of from about 240° to about 420° F., and preferably usually from about 280° to about 320° F. for a period of time of from about 1 minute to about 4 minutes whereby it is gelled and becomes relatively firm. The temperature and the duration of time, as usual, are interdependent and the higher the temperature, the shorter the duration of time can be, and vice versa. The elevated temperature, however, is controlled and is not that high as to activate or decompose the blowing and foaming agent in the gelled, potentially foamable plastisol composition as to cause blowing or foaming at that time.

The thickness of the layer of potentially foamable plastisol composition which is present on the surface of the backing sheet material is normally in the range of from 0.005 inch to about 0.050 inch, depending upon the use the product will be employed in the future.

THE PRINTING OF THE POTENTIALLY FOAMABLE GELLED PLASTISOL COMPOSITION

After the potentially foamable plastisol composition 14 has been heated and dried at a sufficiently high temperature whereby it gels and becomes firm without being blown or foamed, it is then printed with a printing ink composition 16 having therein a dye or pigment or other coloring material to form the desired patterns or designs. The printing ink composition may also contain resins, plasticizers, stabilizers, anti-oxidants, and blow-modifiers including inhibitors, suppressants, retarders, promoters, accelerators, stabilizers, etc., which are, of course, pertinent to the present inventive concept. Drying of the applied printing ink composition 14 may be accomplished by exposure to ambient air or by conventional heat in ovens or like apparatus. Typical printing ink compositions are to be found in the previously mentioned United States Patents. The formulations of the printing ink composition varies widely and the percentage concentrations of the various constituents covers a wide range. Of special interest to the present invention concept, however, is the percentage concentration of the blow-modifier therein which normally is in the range of from about 5% by weight to about 25% by weight of the total printing ink composition. The printed ink composition is, of course, extremely thin and is normally on the order of from about 25 microns to about 65 microns, or, in terms of mils, from about 1/10 of a mil to about ¼ of a mil. The extreme thinness of the layer of printing ink composition is of advantage for the applicability of the present inventive concept for reasons which will become clearer hereinafter.

The invention will be described further in greater detail with particular reference to trimellitic anhydride (the anhydride of 1,2,4-benzenetricarboxylic acid) as the blow-modifier in the printing ink composition but it is to be appreciated that other aromatic anhydrides, as well as aliphatic, cycloaliphatic, heterocyclic, and polycyclic anhydrides are of application within the principles of the present inventive concept. Specific examples of such other anhydrides are:

mellophanic anhydride and dianhydride (the anhydrides of 1,2,3,4-benzenetetracarboxylic acid);

pyromellitic anhydride and dianhydride (the anhydrides of 1,2,4,5-benzenetetracarboxylic acid);

hemimellitic anhydride (the anhydride of 1,2,3-benzenetricarboxylic acid);

monohydroxy trimellitic anhydride (the anhydride of 6-hydroxy-1,2,4-benzenetricarboxylic acid);

succinic anhydride (butanedioic anhydride);

2-hydroxy-3-methyl-succinic anhydride (citramalic anhydride);

pentanoic anhydride (valeric anhydride);

heptanoic anhydride (enanthic anhydride);

maleic anhydride;

dimethyl maleic anhydride (pyrocinchonic anhydride);

methyl maleic anhydride (citraconic anhydride);

benzoic anhydride;

phthalic anhydride;

3,3',4,4'-benzophenone tetracarboxylic dianhydride;

trimellitic anhydride monoacid chloride.

INSPECTION OF THE PRINTED PLASTISOL COMPOSITION

After the gelled, potentially foamable plastisol composition has been printed with the printing ink composition containing the anhydride blow-modifier, and before it is coated with a wear layer or other coating, it is inspected and, if it is determined that the particular printing ink composition was not applied properly or accurately, it is then considered appropriate material for processing under the principles of the present invention concept to salvage it and to avoid its being discarded and thrown away as useless. Such inspection is usually carried out promptly after the printing of the gelled plastisol composition, and, of course, before the blowing and foaming operation. The sooner the inspection is made, the better will be the subsequent neutralization, inhibition, or negation. In any event, such inspection should be made within a few hours, say 2 to 4 hours, after application of the printing ink composition.

THE NEUTRALIZING AND NEGATING TREATING PROCESS

The gelled plastisol composition with the improperly or inaccurately applied printing ink composition on its surface may be treated with the neutralizing and negating composition in many ways. For example, the treatment may be carried out by having the neutralizing and negating composition poured over its surface to remain thereon for the required period of time before being removed, such as by an air blast, or by having the treating composition brushed, padded, or sprayed thereon, etc. The particular treating process which is used does not relate to the essence of the invention and FIGS. 1 - 3 are used merely to illustrate one of such suitable treating processes, referred to herein as the slack loop process.

THE SLACK LOOP TREATING PROCESS

As shown in FIGS. 1 - 3, the gelled plastisol 14 with the unsatisfactory printing ink composition 16 on its surface and supported by the backing sheet material 12 is carried over a pair of driving, constant speed, rotatable guide rolls 20 and 22 and is permitted to droop and hang therebetween to form a running slack loop 24. A spray nozzle 26 directs a spray of neutralizing, inhibiting, or negating composition 28 against the moving sheet of resinous material 10 and, of course, strikes the printing ink composition 16 first and then slowly cascades downwardly, counter-current to the direction of movement of the sheet of resinous material 10. This cascade ultimately forms a small pool of neutralizing and negating composition 28' in the bottom curvature of the slack loop 24 which gradually runs over the side edges of the moving sheet of resinous material 10 to fall into a reservoir of neutralizing, inhibiting and negating composition 28'' in a collecting tank 30 from which it may be recycled to a pump and a filter (neither shown) and then returned to be sprayed over again against the moving sheet of resinous material 10. An air jet 32 may be employed to insure removal of the neutralizing, inhibiting, or negating composition.

Although the spray does strike the printing ink composition 16 first, there is enough pressure and enough time for it to penetrate through the very thin printing ink composition 16 and to soak into the gelled plastisol composition 14. This is as it should be, inasmuch as all of the printing ink composition 16 must be treated by the neutralizing, inhibiting and negating composition 28, whereas, under normal circumstances, only the uppermost portion of the gelled plastisol composition 14 requires equally thorough treatment.

If desired, one or more sprays may be employed, and one or more sprays may even be provided on the inner, other side of the slack loop where the cascading flow of the neutralizing and negating composition will be in the same direction as the movement of the sheet of resinous material 10. In this way, the exposure time may be increased, or the speed of the sheet of resinous material 10 through the slack loop apparatus increased without changing the exposure time.

The amount of neutralizing, inhibiting or negating composition 28 and the speed of movement of the sheet of resinous material through the slack loop apparatus are so coordinated and timed that the neutralizing, inhibiting or negating composition 28 remains in contact with the printing ink composition 16 and the gelled plastisol composition 14 for any desired or required period of time. For the purpose of the present inventive concept, however, a total exposure time of as little as about 2 seconds has been found beneficial and, in other cases, as much as about 20 - 30 seconds has been found to be required. Greater or lesser exposure times may be employed in special circumstances.

THE NEUTRALIZING, INHIBITING OR NEGATING COMPOSITION

The principal constituent of the neutralizing, inhibiting or negating composition is a water soluble chemical or other treating agent possessing a solvent, swelling or softening action on the resinous printing ink composition 16 and on the gelled, resinous plastisol composition 14. It must be capable of swelling and/or softening these resinous materials and rendering them more open in structure and thus more susceptible and more amenable for the neutralizng, inhibiting or negating action which takes place during the washing and treating operation. Additionally, it is to be observed that such swelling and/or softening action must be accomplished without materially affecting the other constituents of the resinous printing ink composition 16 or the resinous plastisol composition 14. This is particularly true with regard to the blowing or forming agent (usually azodicarbonamide) in the plastisol composition 14 which must retain its blowing or foaming capability and efficacy.

The selection of the particular softening or swelling agent will depend to a very large degree upon the chemical characteristics and properties of the polymer in the resinous composition being treated. For the vinyl family of printing ink compositions and plastisol compositions, aliphatic, cycloaliphatic, and aromatic ketones, esters, and ethers; aromatic hydrocarbons; aliphatic hydrocarbons from petroleum fractionation processes; and some alcohols are preferred. These include, for example, methyl ethyl ketone, dimethyl ketone (acetone), diethyl ketone, 4-hydroxy-4-methyl-2-pentanone (diacetone alcohol), cyclohexanone, tetrahydrofuran, tetrahydropyran, 1,3-dioxane (trimethylene glycol methylene ether), 1,4-dioxane (glycol ethylene ether), toluene, benzene, etc. For polyalkylene resinous compositions, such as polyethylene and polypropylene, chlorinated hydrocarbons, chlorinated solvents, and aromatic solvents, especially above about 50° C. are preferred. For acrylic polymeric compositions, aliphatic, cycloaliphatic and aromatic ketones and esters, aromatic and chlorinated hydrocarbons are preferable. For polyamide nylon compositions, phenol, phenolic compounds, and formic acid are preferable.

Other solvent, swelling, and softening (or opening-up) agents include the following: 1-hydroxy-2-butanone; 1-hydroxy-2-propanone; 3-hydroxy-2-butanone; 2-heptanone; 3-hydroxy-2-pentanone; 2-hydroxycyclohexanone; 5-hydroxy-2-pentanone; 3-methylcyclopentanone; methanol; ethanol; 2-amino-1-propanol; 2-dimethylamino-ethanol; 2-methylamino-ethanol; ethanolamine; ethylene chlorohydrin; isopropyl alcohol; hydroxytriethylamine; ethyl cellosolve; methyl cellosolve; glycol monoethyl ether; t-butyl methyl ether; ethyl isopropyl ether; diisopropyl ether; allyl alcohol; etc.

The other principal constituent of the neutralizing, inhibiting or negating composition is water or a water soluble reactive chemical material which is capable of reacting with the anhydride blow-modifier and converting it chemically to another form such as an acid, or an amide, or an ester, or combinations thereof, in which converted form it possesses no interfering blow-modifying properties, or at least to such a low level as not to interfere to any substantial degree subsequently.

The most important reactive type material is water in its various fluid forms (liquid or gaseous) such as water, water vapor, moisture, etc., at elevated temperatures, preferably, up to about 212° F., or dry steam, wet steam, saturated steam, super-heated steam, etc., at elevated temperatures of about 212° F. or higher, when the steam is pressurized or is superheated. The reaction with the anhydride is, of course, a chemical hydrolysis of the anhydride.

Another important reactive type material is ammonium hydroxide, usually employed as 26° Baume, or the more reactive organic amines, which chemical reaction closely parallels that of the reaction of the anhydride with water. The reaction with ammonia or the amines is more aptly termed an amminolysis of the anhydride. Again, such reaction takes place at elevated temperatures, preferably in order to reduce processing time and increase production rates.

Examples of suitable reactive amines are: diethylamine; n-propylamine; di-n-propylamine; n-butylamine; n-amylamine; n-hexylamine; ethylenediamine; etc.

The third important class of reactive type chemical materials comprises the alcohols such as methanol, ethanol, propanol, isopropanyl, butanol, isobutanol, t-butanol, etc., which react in an alcoholysis reaction with the anhydride in somewhat the same general type of reaction as that between the anhydride and water, ammonia, or the amines.

It is to be observed that there is some overlap in the specific reactive type chemical materials and the specific swelling, solvent, or softening chemical materials. For suitable operating conditions, however, these materials are different chemically and are selected from different classes of chemicals. For example, if an alcohol is used as the reactive chemical, then an alcohol is not used as the swelling and softening chemical. And, in the same way, if an amine is used as the reactive chemical, then an amine is not used as the swelling or softening chemical. However, combinations of two or more reactive chemicals may be used, as well as two or more softening or swelling chemicals in the neutralizing, inhibiting, or negating composition.

The concentrations of the swelling or softening chemical and the reactive chemical material in the neutralizing, inhibiting, or negating composition depend upon many factors, such as the temperature, pressure, and time of exposure to the treating process; the concentration of the anhydride blow-modifier in the printing ink composition; etc. For the purposes of the present invention, a concentration of from about 30% by volume to about 70% by volume of the swelling or softening chemical material is used with about 70% to about 30% by volume of the reactive type chemical, all values being based on the total volume of the neutralizing, inhibiting, or negating composition. These values are based on liquid compositions used under ambient or room temperature and normal atmospheric pressure conditions.

Following treatment of the sheet of resinous material 10 by the neutralizing and negating composition 28 in the slack loop 24, the sheet of resinous material 10 moves upwardly, past an airjet or air doctor 32, to be guided over the rotatable guide roll 22 to be forwarded through a heating zone, such as an oven 34, where it is heated at an elevated temperature and dried. Such oven 34 is conventional. It is to be appreciated that there has been a substantial change created in the printing ink composition 16' (see FIGS. 2 and 3) wherein the anhydride blow-modifier has been substantially neutralized and negated, insofar as its blow-modifying properties are concerned. For reasons to be given hereinafter, the capability and the efficacy of the original blow-modifier is substantially negligible.

THE REPRINTING PROCESS

The dried sheet of resinous material 10' may then be reprinted over overprinted with a printing ink composition 16" in any desired pattern or design. After the printing, it may be dried by simple ambient air exposure, or at an elevated temperature in a heating unit such as an oven (not shown). It is to be appreciated that the printing ink composition 16" used in such a standard or conventional reprinting or overprinting process also contains a blow-modifier, such as described previously, or if desired, any blow-modifier known to industry which is capable of modifying the action of the blowing and foaming agent in the gelled plastisol composition 14.

Following the reprinting or overprinting operation, a wear layer of a conventional or standard nature and thickness may be applied, as described in the previously mentioned U.S. patents. Following this, the sheet of resinous material 10' is then forwarded to a heating apparatus, such as an oven 38 where it is heated to a sufficiently elevated temperature and blown or foamed to a desired blow ratio. Such elevated temperature for the blowing and foaming operation is normally in the range of from about 240° to about 440° F. for a period of time ranging from about 1 minute to about 4 minutes. During such blowing and foaming operation, it is to be observed that the blow-modifier in the originally applied printing ink composition 16 is substantially incapable of modifying the blowing or foaming action in the blowing apparatus 38, whereas the blow-modifier in the subsequently applied printing ink composition 16" is fully capable and efficacious in modifying the blowing and foaming operation taking place in the heating apparatus 38 to yield the finished blown and foamed product 10".

The precise mechanism or chemical reaction involved whereby the original anhydride blow-modifier is neutralized and negated and its blow-modifying properties destroyed completely or to such an extent as to be ineffectual, is not precisely known or fully understood. However, it is believed that, in the presence of the water or other reactive chemical in the neutralizing, inhibiting, or negating composition, hydrolysis, amminolysis, or alcoholysis takes place and the anhydride is converted to an acid or an amide or an ester, or combinations thereof in which form its blow-modifier properties are substantially decreased or lost entirely under the specific conditions used herein.

It has occasionally been noted that, after the plastisol composition and printing ink composition have been treated with the neutralizing or negating composition and have been reprinted with the second printing ink composition and subsequently blown and foamed, that the pattern from the second printing ink composition is very sharp and distinct but that there is a faint suggestion of the pattern from the first improperly applied printing ink composition. In such cases, it is suspected that the anhydride blow-modifier in the first printing ink composition, since it was applied directly to the surface of the plastisol composition which is, of course, quite porous, has penetrated into the plastisol composition and has resisted the treatment with the neutralizing and negating composition.

This can easily be avoided by first originally coating the plastisol composition with an overall barrier coating, preferably of a printing ink composition not containing any blow-modifier. Then, the first printing ink composition containing the blow-modifier is applied in its pattern or design but this time the blow-modifier therein does not directly contact the plastisol composition and has no opportunity, or at least a reduced opportunity, to penetrate into the plastisol composition and thereby resist the subsequent treatment with the neutralizing and negating composition. The barrier pre-coating or seal coating with the protective printing ink composition may be of the usual thinness of less than 1 mil, as described previously, and can even be incorporated as part of the pattern or design, as a background or the like.

Although a printing ink composition not containing any blow-modifier has been described as the preferred sealing or barrier coat, it is to be appreciated that any treating composition capable of forming a relatively thin, over-all protective coating on the surface of the potentially foamable gelled, plastisol composition and thus preventing or at least considerably reducing the degree of contact thereof with the printing ink composition containing the blow-modifier is equally useful.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLES I AND II

The backing sheet material is a 0.030 inch thick felt sheet of matted cellulosic fibers which has been impregnated with 5% by weight of a urea-formaldehyde resin and 25% by weight of a copolymer of butadiene and acrylonitrile. The impregnated cellulosic felt sheet is heated at an elevated temperature for a sufficiently long period of time as to dry and cure the applied resin.

The foamable plastisol coating composition which is applied to the impregnated cellulosic felt sheet has an average thickness of about 0.015 inch (as applied and still wet) and has the following composition by weight:

| | Parts |
|---|---|
| Polyvinyl chloride, dispersion grade, specific viscosity 0.6 | 50 |
| Polyvinyl chloride, dispersion grade, specific viscosity 0.4 | 50 |
| Butyl benzyl phthalate plasticiser | 52 |
| Alkyl aryl hydrocarbon secondary plasticiser | 18 |
| Azodicarbonamide blowing agent | 3 |
| Dibasic lead phosphite stabilizer-accelerator | 2 |
| Pigment (Titanium dioxide) | 5 |

The foamable plastisol coating composition is gelled to a firm condition in an oven maintained at a temperature of about 300° F. for a period of about 3 minutes. This elevated temperature of about 300° F. is sufficient to firm and gel the plastisol but not sufficient to activate the blowing agent and cause foaming or blowing.

The blow-modifier containing printing ink composition which is applied to the surface of the gelled plastisol in the desired pattern has the following composition by weight:

| | Parts |
|---|---|
| Vinyl Chloride-vinyl acetate copolymer | 9.0 |
| Methyl ethyl ketone | 56.0 |
| Titanium dioxide pigment (55%) | 25.0 |
| Trimellitic anhydride blow-modifier | 10.0 |

The printed gelled plastisol is then dried. The pattern of the printing ink composition is carefully studied and, in this particular case, is found to be out-of-register and is commercially unacceptable.

It is therefore promptly (within 4 hours) treated with a neutralizing, inhibiting or negating composition which will destroy and render incapable the blow-modifying properties of the trimellitic anhydride without affecting the capability of the azodicarbonamide blowing and foaming agent in the gelled plastisol.

The neutralizing and negating process is carried out as follows in two separate steps on two different portions of the printed gelled plastisol. The apparatus is the apparatus illustrated in FIG. 1.

EXAMPLE I.

The aqueous, ammoniacal neutralizing, inhibiting or negating composition has the following formulation, by volume:
Methyl ethyl ketone; 40%
Water; 55%
Ammonium hydroxide (26° Baume); 5%

EXAMPLE II.

The aqueous neutralizing, inhibiting or negating composition is methyl ethyl ketone and steam at about 212° F.

The exposure time for the water formulation is about 20 seconds. The exposure time for the steam formulation is about 5 seconds. Both materials are given a one-minute forced air dry at a temperature of about 300° F. A white knurl coating is then applied in overall fashion to the treated materials within two hours and an over-printing with another blow-modifier containing printing ink composition in another pattern is made. The new printing ink pattern is carefully studied and found to be satisfactory. A conventional wear layer of about 0.006 inch in thickness is than applied and the material is then heated at a temperature of about 375° F. for a period of about 2 minutes and 45 seconds, whereby it is blown and foamed in conventional fashion.

The effect of both neutralizing and negating compositions (both water and steam) is found to be excellent. The effects of the blow-modifier in the re-printing ink composition are noted as sharp and distinct. The effects of the blow-modifier in the initial printing ink composition are not visible. The final product is commercially acceptable. The embossed product finds excellent use as floor covering.

EXAMPLES III to VI

The procedures of Example I are followed substantially as set forth therein with the exception that different neutralizing, inhibiting, or negating compositions are used. The compositions used are:

| | |
|---|---|
| III | 1 quart (32 ounces) Methyl ethyl ketone |
| | 1 quart (32 ounces) Water |
| | ½ pint (8 ounces) Cyclohexanone |
| | ½ pint (8 ounces) Ammonium hydroxide (26° Baume) |
| IV | 1 quart (32 ounces) Dimethyl ketone (acetone) |
| | 1 quart (32 ounces) Ethyl alcohol |
| | 1 pint (16 ounces) Cyclohexanone |
| | 1 quart (32 ounces) Methyl ethyl ketone |
| V | 1 quart (32 ounces) Methyl ethyl ketone |
| | 1 quart (32 ounces) Water |
| | ½ pint (8 ounces) Tetrahydrofuran |
| | ½ pint (8 ounces) Ammonium hydroxide (26° Baume) |
| VI | 1 quart (32 ounces) Dimethyl ketone (acetone) |
| | 1 quart (32 ounces) Methyl alcohol |
| | 1 pint (16 ounces) Cyclohexanone |
| | 1 quart (32 ounces) Methyl ethyl ketone |

The results are generally comparable to the results obtained in Example I.

EXAMPLES VII to IX

The procedures set forth in Example I are followed substantially as described therein with the exception that the trimellitic anhydride blow-modifier in the printing ink composition is replaced by the following anhydride blow-modifiers, in which event the concentrations thereof used in the printing ink composition may be varied to obtain the most desirable results but keeping within the concentration ranges previously mentioned with regard to trimellitic anhydride.

| VII | Trimellitic anhydride mono acid chloride |
|---|---|
| VIII | Monohydroxy trimellitic anhydride |
| IX | Hemimellitic acid anhydride |

The results are generally comparable to the results obtained in Example I. The effect of the aqueous, ammoniacal neutralizing, inhibiting and negating composition on the blow-modifier in the first printing ink composition is excellent. No effect is noted on the azodicarbonamide in the plastisol composition. Substantially no traces of the original design or pattern of the first printing ink composition are visible. Only the design and pattern of the second reprinting ink composition are noted in the final blown and foamed product, which finds excellent use as a floor covering.

EXAMPLES X TO XII

The procedures set forth in Example I are followed substantially as described therein with the exception that the methyl ethyl ketone solvent and softening agent in the aqueous, ammoniacal neutralizing and negating composition is replaced by the following solvent and softening chemicals, in which event the concentrations thereof may be varied in order to obtain the most desired results but keeping within the ranges previously mentioned with regard to methyl ethyl ketone.

| X | 3-hydroxy-2-pentanone |
|---|---|
| XI | 3-hydroxy-2-butanone |
| XII | acetone |

The results are generally comparable to the results obtained in Example I. The effect of the aqueous, ammoniacal neutralizing, inhibiting and negating composition on the anhydride blow-modifier in the original printing ink composition is excellent. it is also to be observed that such effect is obtained without affecting in any way the blowing and foaming properties of the azodicarbonamide in the plastisol composition. No traces of the original pattern of the original blow-modifier is to be found in the final product. The pattern is solely that due to the blow-modifier in the reprinting printing ink composition.

EXAMPLES XIII TO XVII

The procedures set forth in Example I are followed substantially as described therein with the exception that the proportions of the aqueous, ammoniacal neutralizing and negating composition are changed to the following:

| XIII | Methyl ethyl ketone | 60% |
|---|---|---|
| | Water | 40% |
| | Ammonium hydroxide (26° Baume) | 1% of total |
| XIV | Methyl ethyl ketone | 60% |
| | Water | 40% |
| | Ammonium hydroxide (26° Baume) | 2% of total |
| XV | Methyl ethyl ketone | 45% |
| | Water | 45% |
| | Ammonium hydroxide (26° Baume) | 10% of total |
| XVI | Methyl ethyl ketone | 40% |
| | Water | 60% |
| | Ammonium hydroxide (26° Baume) | 3% of total |
| XVII | Methyl ethyl ketone | 50% |
| | Water | 50% |
| | Ammonium hydroxide (26° Baume) | 4% of total |

The results are generally comparable to the results obtained in Example I. The effect of the aqueous, ammoniacal neutralizing, inhibiting and negating compositions is excellent and it is to be observed that such is obtained without destroying the capability and efficacy of the azodicarbonamide blowing agent in the foamable plastisol composition. Substantially no traces of the original pattern are visible in the final blown and foamed product.

EXAMPLES XVII AND XIX

The procedures set forth in Example I are followed substantially as described therein with the exception that the exposure time of the aqueous, ammoniacal neutralizing, inhibiting and negating composition on the faulty printed plastisol material is (XVIII) reduced to 10 seconds, and (XIX) increased to 25 seconds from 20 seconds.

The results are generally comparable to the results obtained in Example I. The effect of the aqueous, ammoniacal neutralizing, inhibiting and negating composition on the inhibitor in the original pattern areas is excellent and it is to be observed that such is obtained without destroying the capability or the efficacy of the azodicarbonamide blowing agent in the foamable plastisol composition. Substantially no traces of the original pattern are visible in the final blown and foamed product, especially in the products having the longer exposure times.

Although specific examples of the inventive concept have been described, such inventive concept should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. In the art of making chemically embossed sheets of resinous material, a method of salvaging a backing sheet material and a potentially foamable, gelled plastisol composition on which has been improperly applied a printing ink composition containing an organic anhydride blow-modifier which comprises: (1) applying a potentially foamable plastisol composition containing a blowing agent to a backing sheet material; (2) heating said potentially foamable plastisol composition to a temperature of from about 240° to about 420° F. whereby it gels and becomes firm without being blown or foamed; (3) applying a printing ink composition containing an organic anhydride blow-modifier to the gelled, potentially foamable plastisol composition; (4) inspecting the application of said printing ink composition containing said anhydride blow-modifier within about 4 hours after application to determine the appropriateness of such application and, if said printing ink composition is improperly applied; (5) treating said printing ink composition containing said anhydride blow-modifier and said potentially foamable, gelled plastisol composition with a neutralizing and negating composition capable of rendering substantially ineffectual the blow-modifying properties of said anhydride blow-modifier without rendering ineffectual the blowing properties of said potentially foamable, gelled plastisol composition, said neutralizing and negating composition comprising (a) a water soluble chemical having a solvent, swelling and softening effect on said printing ink composition and (b) a reactive chemical capable of reacting with said anhydride blow-modifier, said neutralizing and negating composition being in contact with said printing ink composition for a total exposure time of from about 2 seconds to about 30 seconds; (6) reprinting said potentially foamable, gelled plastisol composition with a printing ink composition containing a blow-modifier; and (7) blowing said potentially foamable, gelled plastisol composition, whereby chemically embossed effects are obtained as a result of said blow-modifier used in the reprinting process, rather than said blow-modifier used in the initial printing process.

2. A method as defined in claim 1 wherein the anhydride is trimellitic anhydride.

3. A method as defined in claim 1 wherein said water soluble swelling and softening chemical is methyl ethyl ketone.

4. A method as defined in claim 1 wherein said water soluble swelling and softening chemical is cyclohexanone.

5. A method as defined in claim 1 wherein said water soluble swelling and softening chemical is tetrahydrofuran.

6. A method as defined in claim 1 wherein said reactive chemical is water.

7. A method as defined in claim 1 wherein said reactive chemical is ammonium hydroxide.

8. A method as defined in claim 1 wherein said reactive chemical is ethanol.

9. A method as defined in claim 1 wherein said plastisol composition is polyvinyl chloride.

10. A method as defined in claim 1, wherein said printing ink composition containing said anhydride blow-modifier is treated with said negating composition at ambient temperatures.

* * * * *